Patented Dec. 18, 1945

2,391,283

UNITED STATES PATENT OFFICE 2,391,283

PROCESS FOR THE HYDROGENATION OF BENZENE

Arthur George Weber, Wilmington, and Merlin Dewey Peterson, Edgemoor Terrace, Del., assignors to E. I. du Pont de Nemours & Company, Wilmington, Del., a corporation of Delaware No Drawing. Application April 11, 1942, Serial No. 438,660

6 Claims. (Cl. 260—667)

This invention relates to a process for the treatment of nickel-aluminum alloy catalysts and more particularly to the activation of said catalysts for use in the hydrogenation of benzene to cyclohexane.

Alloy catalysts containing nickel and aluminum have been used extensively in commercial processes and particularly in the hydrogenation of animal, vegetable, and fish oils, waxes, fats, hydrocarbon oils, and the like, as well as in the hydrogenation of unsaturated and semi-saturated organic compounds. When employed for such purposes these alloy catalysts are invariably activated prior to use which activation may be carried out by subjecting the alloy to hydrogenation under elevated temperatures and pressures, preferably in the presence of moisture, by hydrogenation followed by treatment with water, by solution treatment to dissolve out a portion or all of the aluminum, or by any other means whereby one of the constituents, and generally the aluminum, is wholly or partially removed prior to use.

An object of the present invention is to provide an improved method for the activation of nickel-aluminum alloy catalysts. Yet another object of the invention is to provide a process for the reactivation of a nickel-aluminum catalyst which has lost its activity through use. Still another object of the invention is to provide an improved process for the hydrogenation of benzene to cyclohexane, utilizing a nickel-aluminum alloy catalyst. Another object is to provide, in a continuous process for the hydrogenation of benzene to cyclohexane, an efficient process for the reactivation of the nickel-aluminum catalyst used. Other objects and advantages of the invention will hereinafter appear.

In the use of a nickel-aluminum catalyst for the hydrogenation of organic compounds and especially for the hydrogenation of benzene to cyclohexane, it has been found that the utility of a nickel-aluminum catalyst can be extended and the structural strength of the individual particles of catalyst increased providing a catalyst is employed which during its initial activation is so treated that a major portion of its aluminum content is retained. When this catalyst has been used to such an extent that its activity has been undesirably reduced the catalyst is reactivated by any suitable means whereby a further portion of the aluminum contained therein is removed and it is possible to reactivate the catalyst a number of times in this manner until substantially all of the aluminum has been removed from the catalyst. In accord with the present invention, the initial activation and the reactivation are preferably conducted in the zone in which the hydrogenation is carried out. This procedure eliminates the necessity of removing the catalyst from the converter at frequent intervals, which is a difficult and dangerous step for the catalyst burns spontaneously on contact with air.

The outstanding advantages of this process are illustrated by its use in the hydrogenation of benzene to cyclohexane. In preparing a nickel-aluminum catalyst for this synthesis an alloy is made containing nickel and aluminum, the alloy being crushed and screened to a mesh size of from aproximately 1 to 4. This material is then charged preferably into a cylindrical hydrogenation converter of greater length than the cross section in order that the reaction can be conveniently conducted in a continuous manner and the catalyst activated in place. The activation is conducted by treatment of the catalyst with an aqueous caustic alkali solution, the treatment being carried out until in the order of 20 to 25% of the aluminum has been dissolved from the alloy. Subsequent to the activation and removal of the caustic from the catalyst the hydrogenation is conducted in the converter by the simultaneous introduction under proper temperature and pressure conditions of benzene and hydrogen, preferably the benzene flowing downwardly countercurrent to the flow of the hydrogen. When the reaction has proceeded to such an extent that the catalyst has lost its initial activity hydrogenation is discontinued and the caustic treatment repeated whereby in the order of another 20–25% of the aluminum remaining in the catalyst is removed by solution after which the hydrogenation of the benzene is continued as before.

In carrying out the reactivation, particularly for use in the above-illustrated preferred process, it is advantageous to initiate the reaction with alloys containing 40 to 60% nickel and 60 to 40% aluminum. During the initial activation of such catalysts it has been found that the aluminum content should be reduced to from 5 to 30% in order to prepare a catalyst which is highly active for this type of reaction, and reactions of similar nature. The reactivation subsequent to use should remove substantially an equivalent percentage of aluminum whereupon a reactivated catalyst is obtained having an activity substantially equivalent to that of the catalyst originally employed. This reactivation can be repeated until, as has been stated, substantially no more aluminum is retained in the catalyst at which time the catalyst is discharged.

Various methods of activating the catalyst may be used. The preferred method is to employ a dilute caustic alkali solution which contains in the order of from 0.05 to 1.0 normal sodium hydroxide, other bases may be used such as potassium hydroxide or carbonate, sodium carbonate, etc. This concentration of caustic preferably heated between 90 and 100° C. is pumped into one end of the converter until approximately half of the aluminum it is desired to remove has been dissolved out of the alloy. The caustic is then pumped into the opposite end of the converter until the other half is removed. In order to prevent precipitation of aluminum when washing out the caustic with water the hot caustic is first displaced with cold caustic of substantially the same concentration. The cold caustic may then be displaced by a water-miscible solvent such, for example, as an alcohol and the alcohol displaced, for example, by an alcohol-miscible organic compound and preferably by the compound to be reacted, as in this instance, benzene, or the product of the reaction, cyclohexane.

In order to obtain uniform results from reactions of this nature the catalyst mass should be uniform in its activity and uniform throughout its mass. The above method of activation has been found especially effective in preparing a catalyst of uniform activity throughout. Moreover, this uniformity is attributable not only to the reversal of the flow of the caustic solution through the converter, but also to the use of very dilute caustic whereby there is no great differential between the concentration of the caustic acting on the catalyst in the proximity of the entrance or exit of the converter. Furthermore, it is desirable when activating a catalyst in situ that the catalyst be in fairly massive form and as has been indicated applicants prefer to employ a catalyst having a mesh size ranging from 1 to 4; while somewhat smaller catalyst size may be employed, its use is not as advantageous for the reason that more fines, that is, very fine particles of the catalyst are formed, which pass from the converter often clogging feed lines and in many cases tend to clog portions of the converter itself. For most purposes, therefore, it is desirable to use a catalyst size not much smaller than 8 to 14 mesh.

The hydrogenation of benzene to cyclohexane utilizing activated and reactivated catalysts above described may be carried out at a temperature ranging between 175 and 300° C. and preferably between 225 and 275° C., pressures being employed ranging in the order of 1 to 700 atmospheres with the preferred range between 10 and 75 atmospheres.

The example which follows illustrates a preferred embodiment of the invention in which parts are by weight unless otherwise indicated. A nickel-aluminum alloy was prepared containing 42% nickel and 58% aluminum. This alloy was crushed to a size of 1 to 4 mesh and charged into a cylindrical converter of greater length than cross section. Into one end of the converter an aqueous 0.1 normal NaOH (0.4 wt. %) was pumped at a preheated temperature between 90 and 100° C., the solution flowing at a rate of between 150 and 175 gallons per minute per 220 cu. ft. of space occupied by the catalyst. The flow was continued until the evolution of hydrogen indicated that 10 to 12% of the aluminum present had been dissolved. The direction of the flow of the sodium hydroxide solution through the catalyst bed was then reversed without draining the solution from the bed and the activation continued until the evolution of hydrogen indicated that a total of 20 to 25% of aluminum had been dissolved. The sodium hydroxide-aluminate solution was discarded after a single pass through the catalyst bed. The bed was then washed with a cold 0.1 normal sodium hydroxide solution and then with water. The water was then displaced with methanol and the methanol displaced in turn with benzene. Benzene with an excess of hydrogen was then continuously passed through the converter at a temperature of approximately 250° C. and under a pressure of approximately 30 atmospheres. As a result of this reaction a conversion of substantially 99% or better of cyclohexane was obtained. When the conversion has dropped to less than 99%, say to approximately 98.9 or 98.8%, hydrogenation is discontinued, the residual benzene remaining in the converter removed by washing with alcohol, the alcohol removed by washing with cold 0.1 normal sodium hydroxide solution, and the reactivation of the catalyst commenced with hot 0.1 normal caustic solution. The cycle of operations disclosed above were then repeated until in the order of from 20 to 25% aluminum has been removed from the catalyst and after washing out the catalyst bed as before, the hydrogenation cycle was repeated.

A more uniform catalyst bed may be obtained by more than a single reversal of the flow of the aqueous caustic, but it has been found that a single reversal gives excellent results.

We claim:

1. In a process for the preparation of cyclohexane by the hydrogenation of benzene, the steps which comprise conducting the hydrogenation by contact of the benzene with an activated nickel-aluminum catalyst prepared from an alloy containing 40 to 60% nickel and 60 to 40% aluminum, from which catalyst from 5 to 30% of the aluminum had been removed during activation, carrying out the hydrogenation until the conversion of cyclohexane has dropped below approximately 99%, reactivating the catalyst in situ by treatment with a dilute caustic alkali solution until from 5 to 30% of the remaining aluminum has been removed and subsequently continuing the hydrogenation.

2. In a process for the preparation of cyclohexane by the hydrogenation of benzene, the steps which comprise conducting the hydrogenation by contact of the benzene with an activated nickel-aluminum catalyst which has been prepared from a 42% nickel 58% aluminum alloy activated in situ, the activation being conducted in a reaction zone of relatively great length to cross section wherein from 10 to 12½% of the aluminum is removed by the flow in one direction of length of an aqueous solution having a concentration of approximately 0.1 normal sodium hydroxide solution and a substantially equal amount of aluminum has been removed by a flow of said caustic solution in the opposite direction, carrying out the hydrogenation until the conversion of cyclohexane has dropped below approximately 99%, reactivating the catalyst in substantially the same manner as the alloy was activated and thereafter continuing the hydrogenation.

3. The process in accord with claim 2 wherein subsequent to activation the aqueous sodium hydroxide employed to remove the aluminum is preheated to a temperature between 90 and 100° C., is removed by replacement with cold aqueous sodium hydroxide which is replaced by an alcohol which in turn is replaced by benzene.

4. The process in accord with claim 2 wherein before reactivation the residual benzene is removed from the catalyst by displacement in succession with an alcohol, the alcohol being in turn displaced by the hot aqueous sodium hydroxide solution, and when the aluminum has been removed displacing the hot sodium hydroxide solution by, in succession, cold aqueous sodium hydroxide, an alcohol and benzene.

5. In a process for the hydrogenation of an organic compound by means of an activated nickel-aluminum alloy catalyst, the steps which comprise activating a nickel-aluminum alloy containing 40 to 60% nickel and about 60 to 40% aluminum by the removal of from 5 to 30% of its initial aluminum content, carrying out the hydrogenation with said catalyst until it loses its activity, thereafter reactivating the catalyst in situ by removing a further portion of the aluminum and subsequently continuing the hydrogenation.

6. In a process for the preparation of cyclohexane by the hydrogenation of benzene by means of an activated nickel-aluminum alloy catalyst, the steps which comprise activating a nickel-aluminum alloy containing 40 to 60% nickel and about 60 to 40% aluminum by the removal of from 5 to 30% of its initial aluminum content, carrying out the hydrogenation with said catalyst until it loses its activity, thereafter reactivating the catalyst in situ by removing a further portion of the aluminum and subsequently continuing the hydrogenation.

ARTHUR G. WEBER.
MERLIN DEWEY PETERSON.